(No Model.)
J. PATTERSON.
BLOTTING PAD.
No. 458,481. Patented Aug. 25, 1891.
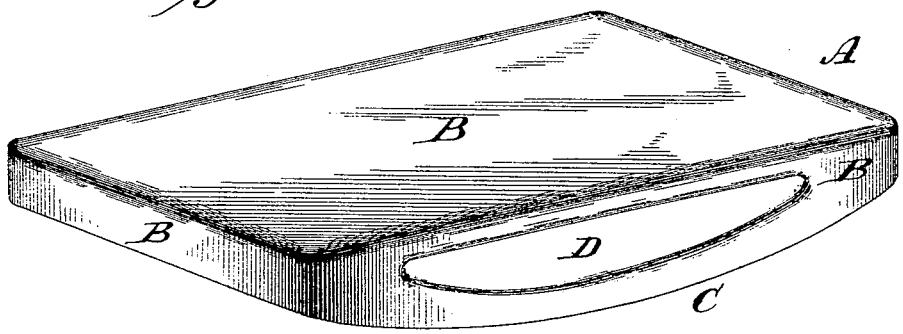
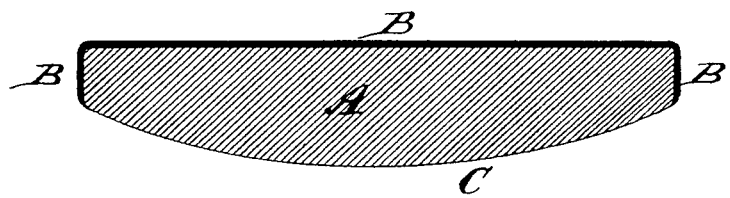
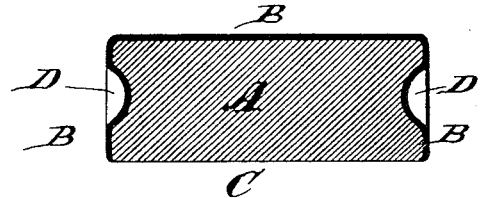
WITNESSES:
F. L. Ourand
[signature]
INVENTOR:
James Patterson,
by Louis Bagger & Co.
his Attorneys.

UNITED STATES PATENT OFFICE.

JAMES PATTERSON, OF COPENHAGEN, DENMARK, ASSIGNOR, BY DIRECT AND MESNE ASSIGNMENTS, TO JULIUS M. JACKSON, OF BALTIMORE, MARYLAND.

BLOTTING-PAD.

SPECIFICATION forming part of Letters Patent No. 458,481, dated August 25, 1891.

Application filed December 17, 1890. Serial No. 375,004. (No model.)

*To all whom it may concern:*

Be it known that I, JAMES PATTERSON, a subject of the King of Denmark, and a resident of Copenhagen, in the Province of Zealand and Kingdom of Denmark, have invented certain new and useful Improvements in Blotting-Pads; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved blotting-pad. Fig. 2 is a longitudinal sectional view of the same, and Fig. 3 is a transverse sectional view.

Like letters of reference denote corresponding parts in all the figures.

This invention has relation to pads for blotting ink; and it consists in a new article of manufacture—to wit, a blotting-pad, or, rather, a blotting-block, made of plaster-of-paris—substantially as will be hereinafter more fully described and claimed.

My improved blotting pad or block is made by mixing a suitable quantity of ordinary plaster-of-paris with water in the proper proportion, and then molding the mixture in a suitable mold into a block A of the configuration illustrated on the drawings. If desired, a suitable pigment or other coloring matter may be added to the plaster-of-paris mixture to give any desired color to the block, such as pink, buff, light blue, or any other desired color in imitation of blotting-paper. After the plaster-of-paris has set and hardened sufficiently it is removed from the mold and the top, ends, and sides (marked B on the drawings) are coated with one or more layers of a suitable varnish—such as shellac or some other varnishing composition—preferably colored in imitation of mahogany, rosewood, or some other wood. The object of this coating (shown at B) is to form a hard finish, so that the device will feel pleasant to handle and not absorb moisture from the hands. The curved or convex under side, however, (marked C on the drawings,) is, of course, not covered with the varnish, as that portion forms the blotter or absorbent part of the device. The two sides of the block are preferably concaved, as shown at D, for the insertion of the ends of the fingers in using the device, so as to form a firm grip or hold.

I am aware that blotting-pads have been made before consisting of a block covered on its convex side with a blotting composition of glue, powdered brick, chalk, borax, and other substances, and I am also aware that blotting-rollers have been made by cutting a pad or roller from solid tripoli-rock, pumice-stone, and other solid rock of a bibulous or absorbent nature; but my improved pad or block is molded from plaster-of-paris and not cut from any solid rock, and it follows that it may be manufactured at a very small expense and molded of any suitable size or shape. Another advantage resulting from the use of plaster-of-paris is that when the convex blotting-surface of the device becomes charged with ink it may be cleaned and made as good as new simply by removing the ink-charged surface by rubbing it with a piece of sand-paper, owing to its softness. Pumice-stone or tripoli-rock is too hard to permit of the ready and easy removal of the ink-charged surface in this manner.

Having thus described my invention, I claim and desire to secure by Letters Patent of the United States—

As an improved article of manufacture, a solid blotting pad or block composed of plaster-of-paris of the shape substantially as shown and having all its parts except its convex blotting-surface covered with an impervious coating of varnish, making a hard finish, substantially as and for the purpose set forth.

In testimony that I claim the foregoing as my own I have hereunto affixed my signature in presence of two witnesses.

JAMES PATTERSON.

Witnesses:
C. A. E. KOESHER,
M. I. JACKSON.